Dec. 27, 1932.   J. BIBBY   1,891,969
POWER TRANSMISSION COUPLING
Filed Feb. 3, 1930
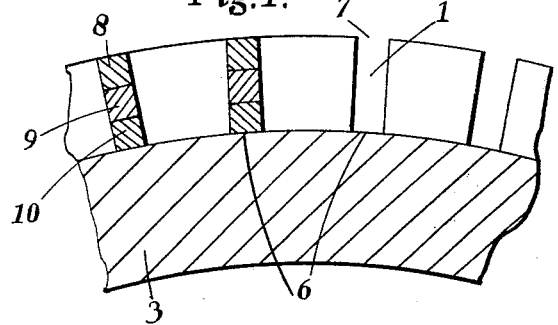
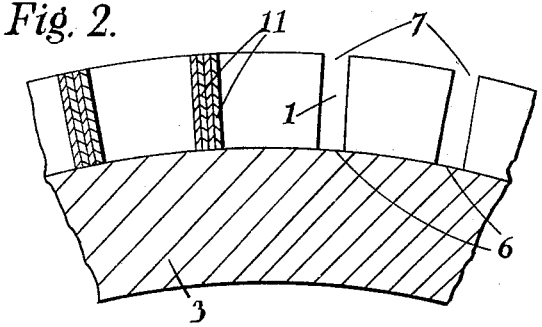
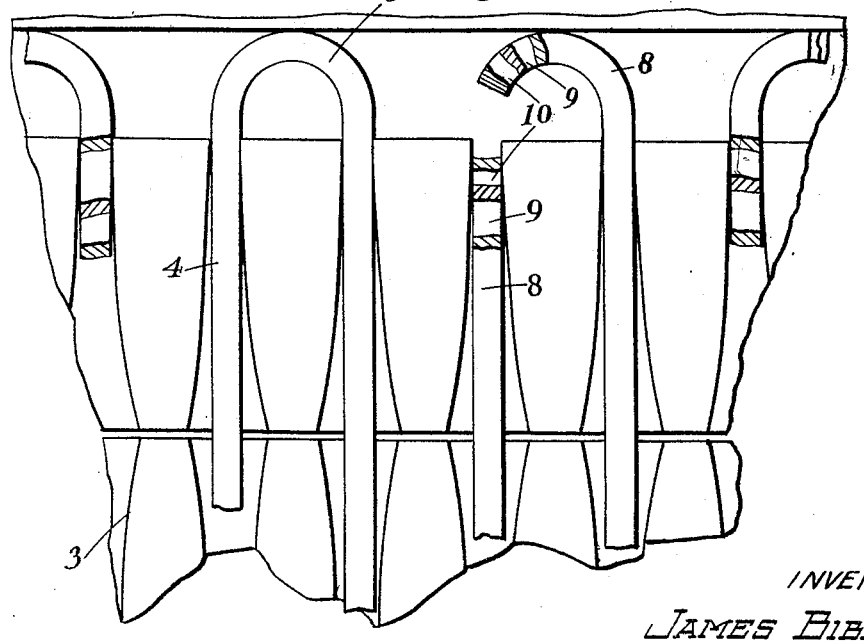
INVENTOR
JAMES BIBBY
BY
ATTORNEY Patented Dec. 27, 1932

1,891,969

UNITED STATES PATENT OFFICE

JAMES BIBBY, OF LONDON, ENGLAND, ASSIGNOR TO THE FALK CORPORATION, OF MILWAUKEE, WISCONSIN, A CORPORATION OF WISCONSIN

POWER TRANSMISSION COUPLING

Application filed February 3, 1930, Serial No. 425,490, and in Great Britain February 4, 1929.

This invention relates to power transmission couplings in which the coupling members on adjacent ends of the shafts to be coupled are formed with axially directed peripheral grooves which accommodate resilient interconnecting members, such as the limbs of a cylindrical or zig-zag spring steel grid, as described for example in the specification of my Patent No. 1,391,713.

In couplings of the kind set forth it is desirable to employ a spring steel grid made from metal of rectangular cross section, and in order to enable them to transmit great power the metal and consequently the reception grooves should be as deep as possible in the radial direction in order to secure maximum spring capacity for any given outside diameter of coupling. As will be understood, however, a consequence of making deep radial grooves with parallel walls is that the base of the grooves are appreciably closer together than the mouths. It follows therefore that if the normal distances apart of the spring limbs at the inner circumference of the cylindrical grid conform to the distances apart of the bases of the grooves, the grid has to be expanded in order to enable the limbs to enter the grooves at the more distantly spaced mouths thereof, and that if the limbs are substantially of corresponding depth to the grooves considerable resistance is offered to such expansion and much force has to be exerted.

The chief object of the present invention is to construct the resilient inter-connecting members so that relatively low resistance will be offered to the expansion necessary when they are to be placed into the grooves of the coupling members, and thus enable large couplings of the type above set forth to be assembled comparatively easily and be utilized for transmitting unusually great power.

According to the present invention the above object is achieved by the employment in a coupling of the kind set forth in which the axially directed grooves in the coupling members are relatively deep in the radial direction of a cylindrical spring metal grid built up from a plurality of sections which may be placed without undue straining into the grooves either individually or collectively to form resilient bridging members having any required depth of interconnection with said grooves.

The building up may be effected in the transverse direction with respect to the grooves by superimposing several shallow grids, or it may be effected in the radial direction by laminating a grid of the required depth.

Reference will now be made to the accompanying drawing, in which

Fig. 1 is an end elevation of part of a coupling member showing the resilient bridging members built up from the limbs of three superimposed shallow grids.

Fig. 2 is a view similar to Fig. 1, but showing the bridging members constituted by laminated limbs of a cylindrical grid.

Fig. 3 is a plan view of part of the coupling showing the shape of the grid.

As already indicated the invention is particularly applicable to the type of power transmission coupling described in the specification of my Patent No. 1,391,713, to which reference may be made for a detailed description.

As shown in the accompanying drawing, the axially directed grooves 1 of the two coupling members 2, 3 are relatively deep and accommodate the limbs 4 of a cylindrical grid 5 of continuous zig-zag form. It will be seen that the bases 6 of the grooves are closer together than the mouths 7 thereof, and in order therefore to enable the cylindrical grid to be sprung into position in the grooves without undue straining, it is preferably constructed as illustrated in Figure 1. In this figure the grid is shown built up from three sections consisting of comparatively shallow cylindrical grids 8, 9 and 10 which are expanded and placed individually into the grooves 1 to assume the superimposed relation indicated and to form together resilient bridging members substantially corresponding in depth to that of the grooves. By building the cylindrical grid in this manner it will be appreciated that much less resistance will be offered to the expansion effected when it is to be placed into the grooves than by making it of single solid cross section and of the same depth as the grooves.

Although in the above example the building up of the grid is effected in the transverse direction with respect to the grooves, it may be effected in the radial direction as shown in Fig. 2.

According to this modification of the invention the spring grid is of laminated form, made from a plurality of sections consisting of a pack of thin deep slats or strips of metal 11 conforming to the continuous zig-zag shape of the entire grid. In this construction the laminations are sprung collectively into position in the grooves 1.

What I claim is:—

1. A flexible coupling for transmitting power from a driving shaft to a driven shaft comprising a cylindrical driving member, a cylindrical driven member facing said driving member, axially directed grooves formed externally on said driving member, similar grooves on the said driven member, and flexible connecting means positioned in said grooves in alignment, said means comprising a plurality of spring strips each of zig-zag form with its limbs passing through said grooves, said strips being arranged with their planes of mutual contact lying concentric with the cylindrical surfaces of the driving and driven members.

2. A flexible coupling for transmitting power from a driving shaft to a driven shaft comprising a cylindrical driving member, a cylindrical driven member facing said driving member, axially directed grooves formed externally on said driving member, similar grooves on the said driven member, and flexible connecting means positioned in said grooves in alignment, said means consisting of a composite cylindrical grid composed of a plurality of co-axially superposed cylindrical spring grid elements.

3. A flexible coupling for transmitting power from a driving shaft to a driven shaft comprising a cylindrical driving member, a cylindrical driven member facing said driving member, axially directed grooves formed externally on said driving member similar grooves on the said driven member, and flexible connecting means positioned in said grooves in alignment, said means consisting of a composite cylindrical grid composed of a plurality of co-axially superposed cylindrical spring grid elements.

In testimony whereof I have signed my name to this specification.

JAMES BIBBY.